(12) United States Patent
Magin et al.

(10) Patent No.: US 8,674,539 B1
(45) Date of Patent: Mar. 18, 2014

(54) POWERLINE COMMUNICATION POWER SUPPLY AND MODEM INTERFACE MECHANISM

(75) Inventors: Gregory A. Magin, Ocala, FL (US); Celestino A. Corral, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 13/115,700

(22) Filed: May 25, 2011

Related U.S. Application Data

(60) Provisional application No. 61/388,719, filed on Oct. 1, 2010.

(51) Int. Cl.
*H02J 1/00* (2006.01)
*H02J 3/02* (2006.01)
*H04B 3/54* (2006.01)

(52) U.S. Cl.
USPC .......................... 307/2; 307/1; 307/3; 307/4

(58) Field of Classification Search
USPC .................................................. 307/1, 2, 3, 4
See application file for complete search history.

(56) References Cited

U.S. PATENT DOCUMENTS

| | | | |
|---|---|---|---|
| 4,683,529 A | 7/1987 | Bucher, II | |
| 4,825,350 A | 4/1989 | Brackman, Jr. | |
| 5,619,494 A | 4/1997 | Nishikawa et al. | |
| 7,256,638 B2 | 8/2007 | Vice | |
| 2007/0131784 A1 | 6/2007 | Garozzo et al. | |
| 2009/0310688 A1 | 12/2009 | Ikeda | |

FOREIGN PATENT DOCUMENTS

| | | |
|---|---|---|
| DE | 102008009542 A1 | 10/2009 |
| DE | 102008009542 B4 | 6/2010 |
| EP | 2090958 A1 | 8/2009 |
| KR | 20060094578 A | 8/2006 |
| KR | 20100135639 A | 12/2010 |
| KR | 20110062559 A | 6/2011 |
| WO | 2012044542 | 4/2012 |

OTHER PUBLICATIONS

International Search Report—PCT/US2011/052996—ISA/EPO—Feb. 16, 2012.
"PCT Application No. PCT/US2011/052996 International Preliminary Report on Patentability", Feb. 11, 2013, 6 pages.

*Primary Examiner* — Hal Kaplan
(74) *Attorney, Agent, or Firm* — DeLizio Gilliam, PLLC

(57) ABSTRACT

Functionality of a powerline communication (PLC) power supply and modem interface can be implemented using a power supply processing unit and a PLC modem unit that can be coupled together using standard, two-wire cabling. The power supply processing unit can generate a DC power signal and a zero cross signal based on an AC powerline signal received via a PLC network. The power supply processing unit can modulate the zero cross signal onto the DC power signal. The power supply processing unit can then generate a composite PLC signal comprising a PLC signal (extracted from the AC powerline signal) and the DC power signal modulated with the zero cross signal. The PLC modem unit can extract the PLC signal, the DC power signal, and the zero cross signal from the composite PLC signal, and then can process the PLC signal based on information associated with the zero cross signal.

25 Claims, 9 Drawing Sheets

POWERLINE COMMUNICATION POWER SUPPLY AND MODEM INTERFACE MECHANISM

RELATED APPLICATIONS

This application claims the priority benefit of U.S. Provisional Application No. 61/388,719 filed Oct. 1, 2010.

BACKGROUND

Embodiments of the inventive subject matter generally relate to the field of powerline communication systems and, more particularly, to a powerline communication power supply and modem interface mechanism.

Electric transmission and distribution lines are typically used for providing electric power from generators to buildings, residences, and other infrastructure. Electric power is transmitted over the transmission lines at a high voltage, and distributed to buildings and other structures at much lower voltages using electric power lines. Besides providing electric power, electric power lines can also be used to implement powerline communications within buildings and other structures. Powerline communications provides a means for networking electronic devices together and for connecting the electronic devices to the Internet. For example, HomePlug® devices can be used for wired broadband networking using IEEE P1901 standards for broadband over powerline communication.

SUMMARY

Various embodiments of a powerline communication power supply and modem interface are disclosed. In one embodiment, the powerline communication (PLC) power supply and modem interface comprises a power supply processing circuit operable to generate a DC power signal based on an AC powerline signal received via a PLC network. The power supply processing circuit is operable to determine an AC zero cross signal associated with the received AC powerline signal. The power supply processing circuit is also operable to modulate the AC zero cross signal onto the DC power signal. The power supply processing circuit is operable to extract a PLC signal from the AC powerline signal, and generate a composite PLC signal comprising the PLC signal and the DC power signal modulated with the AC zero cross signal. The PLC power supply modem interface also comprises a PLC modem circuit operable to extract the PLC signal from the composite PLC signal received from the power supply processing unit, extract the DC power signal modulated with the AC zero cross signal from the composite PLC signal, and extract the AC zero cross signal from the DC power signal modulated with the AC zero cross signal. The PLC modem circuit is also operable to process the PLC signal based, at least in part, on zero cross information associated with the zero cross signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
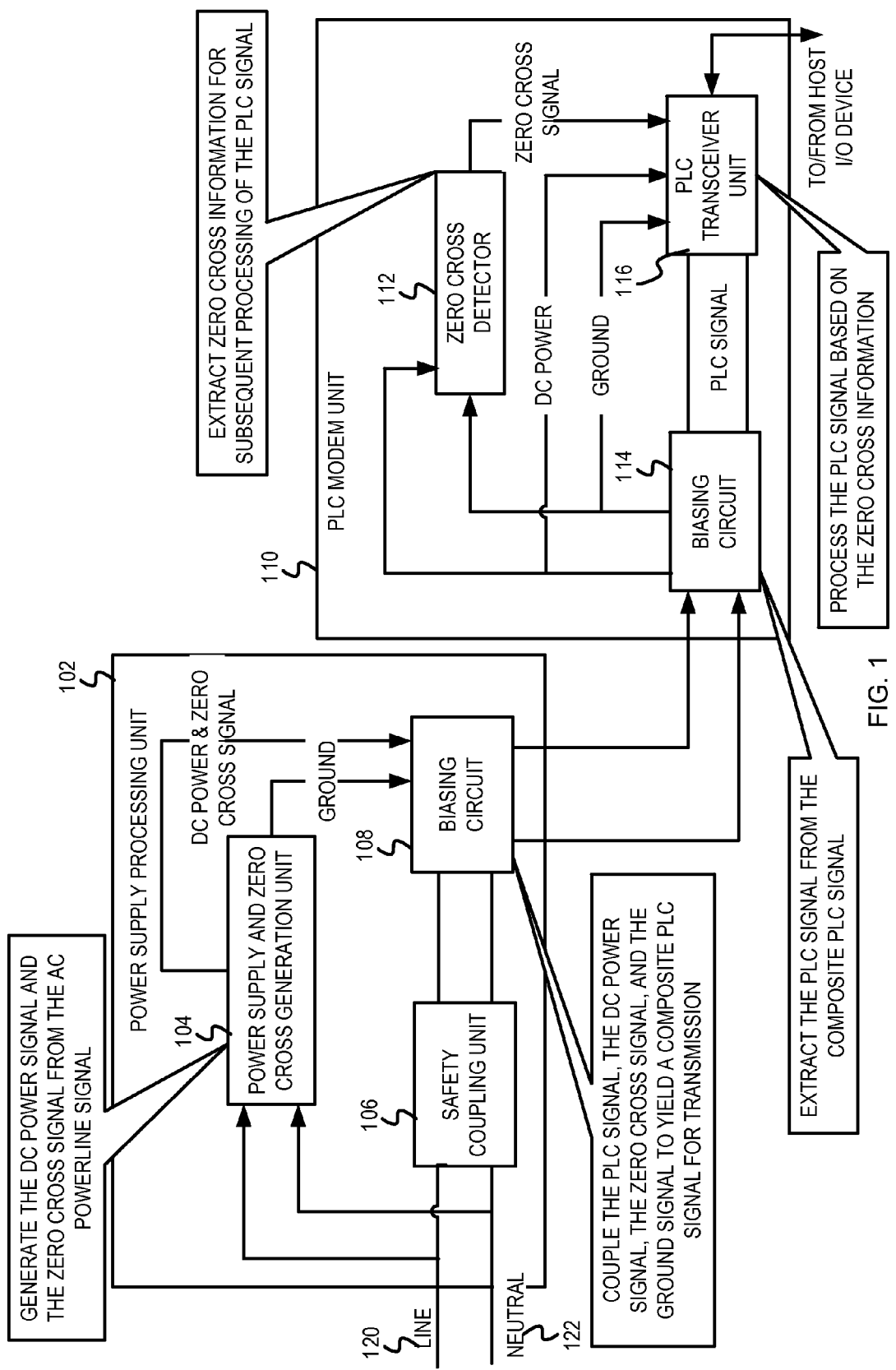
FIG. 1 is an example conceptual diagram illustrating one example of a powerline communication power supply and modem interface mechanism that utilizes a two-wire connection for power, PLC signal and zero cross information, according to some embodiments.

The description that follows includes exemplary systems, methods, techniques, instruction sequences, and computer program products that embody techniques of the present inventive subject matter. However, it is understood that the described embodiments may be practiced without these specific details. For instance, although examples refer to implementing a powerline communication power supply and modem interface mechanism for a powerline communication system with a two-wire power supply coupling to a power outlet, in other embodiments the powerline communication power supply and modem interface mechanism may include a three-wire power supply coupling to a power outlet. In other instances, well-known instruction instances, protocols, structures, and techniques have not been shown in detail in order not to obfuscate the description.

Powerline communication (PLC) modems can enable powerline communication via a powerline network. PLC modems are typically included within a PLC adapter module that is a self-contained unit comprising an integrated power supply, zero cross detector (e.g., for lining up PLC transmissions relative to the AC line cycle frequency), the PLC modem, and other signal processing components. The PLC adapter module is typically connected to the powerline network via a power outlet, and is also connected to a host device via a host interface (e.g., Ethernet) to provide data received via the powerline network.

As powerline communication gains wider acceptance, communication devices that implement other communication technologies can be configured to also support powerline communication to implement a cost-effective, single-point communication solution. For example, PLC capabilities may be incorporated into electronic systems such as set-top boxes, multimedia centers, gaming consoles, laptops, etc. In some embodiments, functionality of the PLC adapter module can be offloaded into two distinct units—a power supply processing unit and a PLC modem unit. The PLC modem unit can be integrated with other communication devices (e.g., a WLAN chipset) within an electronic system (e.g., mounted on one of the circuit boards within the electronic system). The power supply processing unit can comprise the power supply, zero cross detector, and safety coupling networks, and can be implemented external to the electronic system (e.g., in a wall module that connects to a power outlet). However, implementing such a single-point communication solution may require a multi-wire conducting cable/interface mechanism (for connecting the power supply processing unit to the PLC modem unit) with two conductors for power and power ground return, two conductors for exchange of bi-directional PLC signals, one conductor for indicating zero cross information, and in some cases additional conductors for control and shield signals. Such a multi-conductor cable assembly interface that employs non-standard, multi-conductor cabling is typically impractical, bulky and expensive.

In some embodiments, techniques can be implemented to support powerline communication via the power supply processing unit and the PLC modem unit on standard low-cost, two-wire (or multi-wire) cabling that can be identical (or similar) to the cabling used in ubiquitous AC adapter power supplies. From an input AC powerline signal, the power supply processing unit can generate the DC power signal and ground signal supplied to the PLC modem unit, and the zero cross signal that enables proper processing of the PLC signal by the PLC modem unit. The zero cross signal can be modulated onto the DC power signal. The power supply processing unit can combine the PLC signal (also extracted from the AC powerline signal) with the DC power signal (that comprises the modulated zero cross signal) to yield a composite PLC signal. The composite PLC signal can then be provided to the PLC modem unit (e.g., via the two-wire cable) for further processing. At the PLC modem unit, the zero cross signal can be extracted from the modulated DC power signal. The zero cross signal can be used to generate timing and synchronization information for proper processing of the PLC signal, as will be further described below. Such an external power supply/coupler mechanism using a two-wire interface can enable the PLC modem unit to effectively connect to the powerline network via the power supply processing unit without resorting to extra cabling and with little or no impact on powerline communication performance or circuit safety.

FIG. 1 is an example conceptual diagram illustrating one example of a powerline communication power supply and modem interface mechanism that utilizes a conventional two-wire connection for power, PLC signal and zero cross information, according to some embodiments. FIG. 1 depicts a power supply processing unit 102 coupled with a PLC modem unit 110. The power supply processing unit 102 comprises a safety coupling unit 106, a biasing circuit 108, and a power supply and zero cross generation unit 104. The PLC modem unit 110 comprises a zero cross detector 112, a biasing circuit 114, and a PLC transceiver unit 116. The power supply processing unit 102 is coupled to the powerline network via a powerline socket (not shown in FIG. 1). In one implementation, the power supply processing unit 102 can be a wall module that is connected to (either permanently connected to or plugged in on-demand to) a powerline socket of the powerline network. In this implementation, the PLC modem unit 110 can be implemented within a PLC-enabled electronic device ("PLC device"), such as a laptop, a television set-top box, a multimedia center, a gaming console, and other suitable electronic devices. For example, the PLC modem unit 110 may be implemented within an integrated circuit that is mounted on a circuit board of the electronic device. In another example, the PLC modem unit 110 can be integrated with other communication devices (e.g., a WLAN device) within an integrated circuit (e.g., a system-on-a-chip (SoC)) that is mounted on a circuit board of the electronic device. In another implementation, the power supply processing unit 102 can be implemented as part of a power adapter (e.g., a laptop adapter) associated with the PLC device. In this implementation, the PLC modem unit 110 may be integrated within the PLC device (e.g., on the motherboard of the laptop). In some implementations, the power supply processing unit 102 can then be coupled to the PLC modem unit 110 via a two-wire (or multi-wire) cable.

As depicted in FIG. 1, the line terminal connecting wire 120 and the neutral terminal connecting wire 122 of the powerline socket are coupled to the safety coupling unit 106 of the power supply processing unit 102. The power supply processing unit 102 receives an AC powerline signal via the line terminal connecting wire 120 and the neutral terminal connecting wire 122. The AC powerline signal can comprise a high voltage AC power waveform (e.g., a 120V AC, 60 Hz waveform) and a superposed PLC signal. The PLC signal typically comprises control/management/data bits that are communicated from a source PLC device (not shown) to a destination PLC device (e.g., the PLC device comprising the PLC modem unit 110). The safety coupling unit 106 provides electrical isolation between the powerline network and users of the power supply processing unit 102.

The AC powerline signal received from the powerline socket is also provided to the power supply and zero cross generation unit 104. The power supply and zero cross generation unit 104 generates a DC power signal, a zero cross signal, and a ground signal from the AC powerline signal, as will be described with reference to FIGS. 3-6. The DC power signal provides the requisite DC voltage (e.g., 3.3V DC) to ensure operation of various digital processing components of the power supply processing unit 102 and the PLC modem unit 110. The ground signal provides a stable ground reference (e.g., for signal voltage measurement and analysis). The zero cross signal comprises zero cross information that indicates the zero crossings associated with the AC powerline signal (i.e., time instants at which the AC powerline signal crosses a zero voltage reference line or has a zero voltage). In some implementations, the power supply and zero cross generation unit 104 can modulate the zero cross signal onto the DC power signal, as will be further described with reference to FIGS. 3-6. The DC power signal modulated with the zero cross signal is herein referred to as the "modulated DC power signal." The power supply and zero cross generation unit 104 can provide the modulated DC power signal and the ground signal to the biasing circuit 108. As will be further described with reference to FIG. 2, the biasing circuit 108 can combine the modulated DC power signal and the ground signal with the PLC signal (extracted from the AC powerline signal) to yield a composite PLC signal, and can provide the composite PLC signal via a two-wire cabling (between the biasing circuits 108 and 114) to the PLC modem unit 110.

At the PLC modem unit 110, the biasing circuit 114 separates the modulated DC power signal and the ground signal from the PLC signal. The biasing circuit 114 extracts the PLC signal from the composite PLC signal and provides the extracted PLC signal to the PLC transceiver unit 116. The biasing circuit 114 provides the modulated DC power signal to the zero cross detector 112. The biasing circuit 114 also ensures that the modulated DC power signal and the ground signal are provided to the PLC transceiver unit 116 to enable operation of the PLC transceiver unit 116. The zero cross detector 112 extracts the zero cross signal from the modulated DC power signal and consequently extracts the zero cross information from the zero cross signal, as will be described with reference to FIGS. 7-8. The zero cross detector 112 then provides the zero cross information to the PLC transceiver unit 116 to enable subsequent processing of the PLC signal by the PLC transceiver unit 116. The PLC transceiver unit 116 then processes the PLC signal using the zero cross information.

Figure 2:
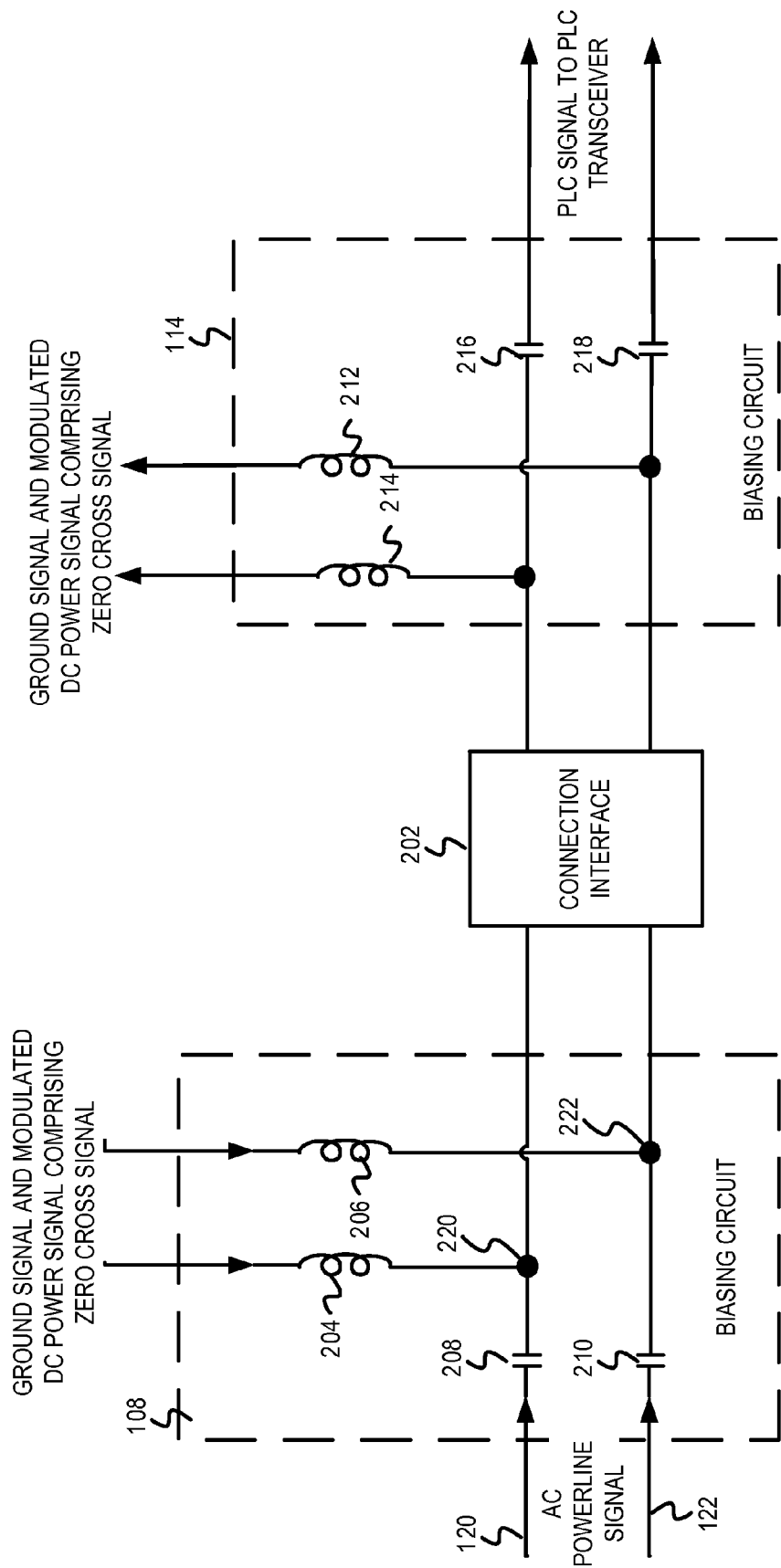
FIG. 2 is an example circuit diagram illustrating one embodiment of biasing circuits of the power supply processing unit and the PLC modem unit, according to some embodiments.

FIG. 2 is an example circuit diagram illustrating one embodiment of the biasing circuits of the power supply processing unit and the PLC modem unit, according to some embodiments. The biasing circuit 108 of the power supply processing unit 102 receives the AC powerline signal including the PLC signal from the powerline network from two connecting wires (e.g., typically the line terminal connecting wire 120 and the neutral terminal connecting wire 122) via the safety coupling unit 106. The biasing circuit 108 also receives the modulated DC power signal and the ground signal (along the two connecting wires) as described with reference to FIG. 1. The modulated DC power signal and the ground signal filtered by inductors 204 and 206 that are respectively connected on the line terminal connecting wire 120 and the neutral terminal connecting wire 122. The inductors 204 and 206 pass (or present a low impedance path to) DC and low frequency signal components (e.g., the modulated DC power signal and the ground signal) and block (or present a high impedance path to) the higher frequency signal components (e.g., the PLC signal). The AC powerline signal is filtered by capacitors 208 and 210 connected on the line terminal connecting wire 120 and the neutral terminal connecting wire 122, respectively. The capacitors 208 and 210 block the DC and the low frequency signal components (e.g., the modulated DC power signal and the ground signal) and provide a low impedance path for the high frequency PLC signal. After filtering, the modulated DC power signal and the ground signal at the output terminals of the inductors 204 and 206 and the PLC signal at the output of the capacitors 208 and 210 are coupled (depicted by summing nodes 220 and 222 on the line terminal connecting wire 120 and the neutral terminal connecting wire 122, respectively) to yield the composite PLC signal. The biasing circuit 108 then provides the composite PLC signal to the biasing circuit 114 of the PLC modem unit 110 via the two-wire (or multi-wire) cable. In one implementation, the connection interface 202 may be a two-pin plug and socket connection device that couples the power supply processing unit 102 to the PLC modem unit 110.

The biasing circuit 114 receives the composite PLC signal from the power supply processing unit 102 via the line terminal connecting wire 120 and the neutral terminal connecting wire 122. The biasing circuit 114 passes the composite PLC signal through capacitors 216 and 218 connected on the line terminal connecting wire 120 and the neutral terminal connecting wire 122, respectively, to yield the PLC signal that is provided to the PLC transceiver unit 116 for subsequent processing. The capacitors 216 and 218 block the DC and the low frequency signals (i.e., the modulated DC power signal and the ground signal) and provide a low impedance path for the high frequency PLC signal. The biasing circuit 114 also passes the composite PLC signal through inductors 214 and 212 on the line terminal connecting wire 120 and the neutral terminal connecting wire 122 to yield the ground signal and the modulated DC power signal, which is subsequently processed to extract the zero cross information (as will be further described with reference to FIGS. 7-8). The inductors 214 and 212 pass the DC and low frequency signals and block the higher frequency PLC signals. It is noted that the values of the inductors 204, 206, 212, and 214 and the values of the capacitors 208, 210, 216, and 218 can be selected based, at least in part, on the frequency of the PLC signal.

Figure 3:
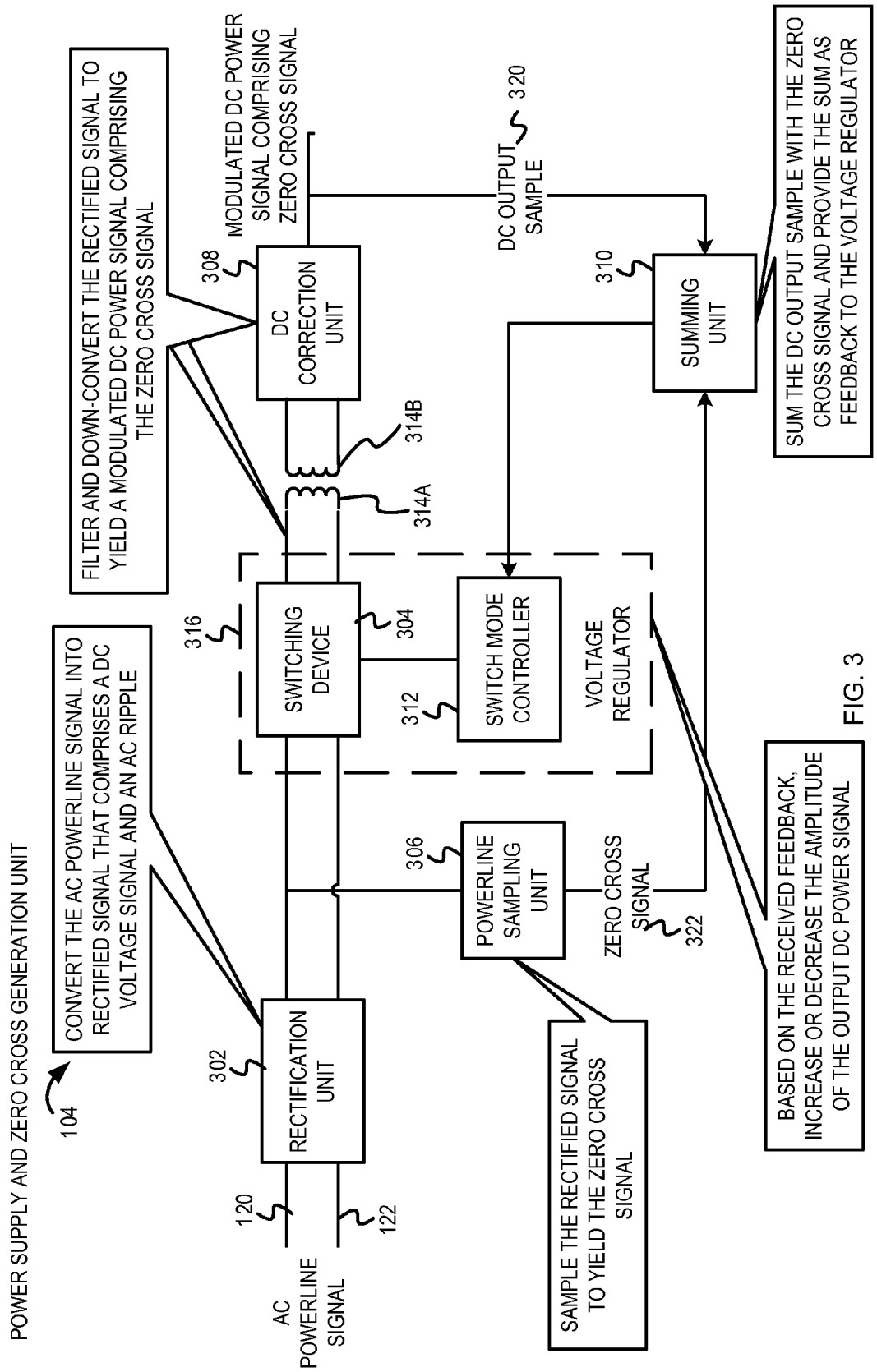
FIG. 3 is a block diagram illustrating one example of the power supply and zero cross generation unit.

FIG. 3 is a block diagram illustrating one example of the power supply and zero cross generation unit 104. The power supply and zero cross generation unit 104 converts an AC power signal received from the powerline socket to a low voltage direct current (DC) signal, which is provided to electronic components (e.g., integrated circuits (ICs)) that utilize a constant, stable DC voltage source for proper operation. The power supply and zero cross generation unit 104 comprises a rectification unit 302, a voltage regulator 316, a DC output generation unit 308, a summing unit 310, and a powerline sampling unit 306. The voltage regulator 316 comprises a switch mode controller 312 and a switching device 304. As depicted in FIG. 3, the AC powerline signal received on the line terminal connecting wire 120 and the neutral terminal connecting wire 122 from the powerline socket is provided to the rectification unit 302. The output of the rectification unit 302 is further coupled with the switching device 304 of the voltage regulator 316. The output of the switching device 304 is coupled with the primary winding 314A of a transformer, while the second winding 314B of the transformer is coupled with the DC output generation unit 308. The DC signal at the output of the DC output generation unit 308 is sampled, and the resulting DC output sample 320 is provided to the summing unit 310. Furthermore, a powerline sampling unit 306 samples the output of the rectification unit 302 and provides the resultant sampled output to the summing unit 310. The output of the summing unit 310 is provided to the switch mode controller 312. The switch mode controller 312 controls the operation of the switching device 304.

The rectification unit 302 receives the AC powerline signal via the line terminal connecting wire 120 and the neutral terminal connecting wire 122. The rectification unit 302 converts the AC powerline signal into a DC voltage signal comprising an AC ripple ("rectified signal"). As depicted in the example circuit diagram of the power supply and zero cross generation unit 104 of FIG. 4, the rectification unit 302 comprises a diode bridge 402 and a capacitor 404. One set of opposite ends of the diode bridge 402 are coupled to the line terminal connecting wire 120 and the neutral terminal connecting wire 122 of the powerline network. The other set of opposite ends of the diode bridge 402 serve to connect the diode bridge 402 in parallel with the capacitor 404. One end of the capacitor 404 and the corresponding end of the diode bridge 402 to which this end of the capacitor 404 is connected, is also connected to Earth ground 406. The other end of the capacitor 404 and the corresponding end of the diode bridge 402 to which this end of the capacitor 404 is connected, is connected to a first terminal of the primary winding 314A of the transformer. In response to receiving an input AC powerline waveform 401, the diode bridge 402 in conjunction with the capacitor 404 can convert the input AC powerline waveform 401 into the rectified signal 410. The rectified signal 410 comprises a DC voltage signal with a superimposed AC ripple. As depicted by the waveforms 401 and 410 of FIG. 4, in some examples, the frequency of the AC ripple is twice the frequency of the line frequency of the AC powerline waveform 401. For example, if the line frequency is 60 Hz, the AC ripple frequency at the output of the rectification unit 302 will be 100 Hz. The rectified signal is then coupled to the high voltage primary winding 314A of a transformer. The transformer decreases (or steps-down) the amplitude of the rectified signal (based on the ratio of the number of turns of the primary winding 314A of the transformer to the number of turns of the secondary winding 314B of the transformer) to generate a low voltage rectified signal. The low voltage rectified signal at the secondary winding 314B of the transformer is then provided as input to the DC output generation unit 308.

Figure 4:
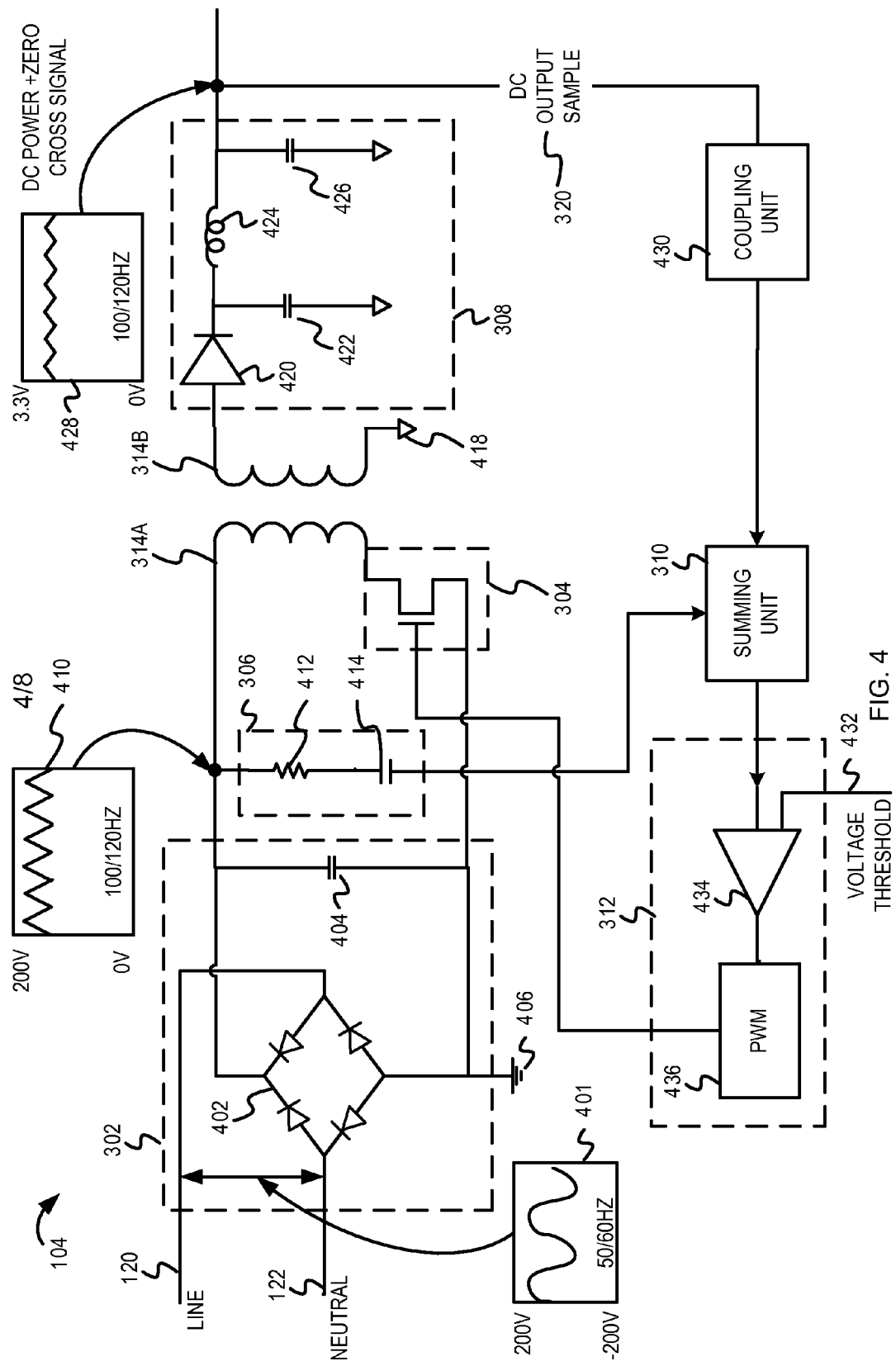
FIG. 4 is an example circuit diagram illustrating one embodiment of the power supply and zero cross generation unit.

The DC output generation unit 308 can comprise one or more filter stages that filter the rectified signal and minimize the AC ripple from the rectified signal to yield the DC power signal. In one example, as depicted with reference to FIG. 4, the DC output generation unit 304 can comprise a rectifier with a capacitor filter network. In FIG. 4, the DC output generation unit 308 comprises a diode 420 connected at the output of the secondary winding 314B of the transformer. The diode 420 is also connected in series with a C-L-C pi filter. In the example shown in FIG. 4, the positive terminal of the diode 420 can be connected to a first output terminal of the secondary winding 314B of the transformer, and the negative terminal of the diode 420 can be connected to a first terminal of an inductor 424 and to a first terminal of a capacitor 422. The second terminal of the inductor 424 can be connected to a first terminal of a capacitor 426. The second terminals of the capacitors 422 and 426 and the second output terminal of the secondary winding 314B of the transformer can be connected to ground 418. In one implementation, the values of the capacitor 422, the inductor 424, and the capacitor 426 can be selected based, at least in part, on the line frequency of the AC powerline waveform 401. The diode 420 can rectify the low voltage signal at the output of the secondary winding 314B of the transformer, while the filter can reduce the high frequency ripple.

The DC power signal at the output of the DC output generation unit 308 is sampled (e.g., by a feedback unit, not shown in FIG. 3) and the resultant DC output sample 320 is fed back into the closed loop system of the power supply and zero cross generation unit 104. As shown in FIGS. 3 and 4, the DC output sample 320 is provided as one input to the summing unit 310 via the feedback loop. In one implementation, as depicted with reference to FIG. 4, the DC output sample 320 can be fed back into the closed loop system via a coupling unit 430 (e.g., an opto-coupler) that isolates high voltage components (e.g., the rectification unit 302) and low voltage components (e.g., the DC output generation unit 308) or an impedance matching unit. In another implementation, the DC output sample 320 can be directly fed back into the closed loop system. The feedback loop can enable the voltage regulator 316 to quickly react to and counter the effect of any transient line voltage variation (i.e., in the input AC powerline waveform 401) and load current variation. As will be further described below, within the voltage regulator 316, the switch mode controller 312 can appropriately control the duty cycle of the switching device 316 to regulate and to maintain a relatively constant output DC voltage over load and line variations.

Additionally, the powerline sampling unit 306 samples the rectified signal 410 generated at the output of the rectification unit 302 to yield an AC ripple sample that is also injected into the closed loop system. The AC ripple sample is representative of the zero cross information associated with the AC powerline signal and is herein referred to as the zero cross signal 322. The zero cross information indicates the zero crossings associated with the AC powerline waveform 401. The powerline sampling unit 306 can use various techniques to generate the zero cross signal. In one implementation, the zero cross signal can be a reduced amplitude version of the AC powerline signal 401 (e.g., a sine wave). In this implementation, the zero crossings occur at exactly the same frequency as the AC line frequency. In another implementation, the zero cross signal can be generated from the AC ripple at the output of the rectification unit 302. In this implementation, the zero crossings occur at twice the AC line frequency, if a full-wave rectifier is employed as part of the rectification unit 302. However, the zero crossings can occur at the AC line frequency, if a half-wave rectifier is employed as part of the rectification unit 302. In one example as depicted in FIG. 4, the powerline sampling unit 306 comprises a resistor 412 connected in series with a capacitor 414. In other words, a first terminal of the resistor 412 is connected to the ungrounded terminal of the capacitor 404 (i.e., the output of the rectification unit 302). A second terminal of the resistor 412 is connected to a first terminal to the capacitor 414, while the second terminal of the capacitor 414 is coupled with the summing unit 310. The resistor 412 attenuates the sampled rectified signal to set the current level injected into the feedback loop. The capacitor 414 blocks the DC component of the sampled rectified signal, thus generating the zero cross signal 322. In another example, the powerline sampling unit 306 can be other suitable sampling devices (e.g., a 1-bit ADC). The powerline sampling unit 306 provides the zero cross signal 322 as a second input to the summing unit 310. Thus, the zero cross signal 322 (i.e., the AC ripple sample) and the DC output sample 320 are provided as inputs to the summing unit 310. The summing unit 310 can combine the DC output sample 320 with the zero cross signal 322 to yield a feedback signal that is provided to the switch mode controller 312 of the voltage regulator 316. Although not depicted in FIG. 4, in some implementations, the summing unit 310 can also comprise one or more gain stages to amplify/attenuate the feedback signal prior to providing the feedback signal to the switch mode controller 312. Furthermore, in some implementations, the summing unit 310 can comprise other processing components (e.g., a phase shift unit) to "tailor" the error signal as desired (e.g., to vary the position of signal peaks in the error signal).

The switch mode controller 312 can compare the feedback signal with a threshold signal and accordingly generate an error signal that indicates whether the DC power signal level should be increased or decreased to maintain stability of the DC power signal. In one example, as depicted with reference to FIG. 4, the switch mode controller 312 comprises a comparator 434 coupled with a pulse width modulator (PWM) 436. The feedback signal generated by the summing unit 310 is provided as one input to the comparator 434. The other input to the comparator 434 is a voltage threshold 432 that indicates the amplitude at which the DC power signal (at the output of the DC output generation unit 308) is to be maintained. The comparator 434 can monitor the DC power signal level by comparing the feedback signal (i.e., the DC output sample 320) against the voltage threshold 432 and can accordingly generate the error signal. The error signal can be proportional to the difference between the DC power signal level at the output of the power supply and zero cross generation unit 104 (i.e., the output DC sample 320) and the desired DC power output (i.e., the voltage threshold 432). In one implementation, the error signal may be calculated as the difference between the output DC sample 320 and the voltage threshold 432. In another implementation, the error signal may be a scaled representation of the difference between the output DC sample 320 and the voltage threshold 432. In one example, a positive error signal can be generated if the amplitude of the feedback signal is greater than the voltage threshold 432, and a negative error signal can be generated if the amplitude of the feedback signal is less than the voltage threshold 432.

The PWM 436 can receive the error signal as an input and can generate a switching waveform with a duty cycle that is based on the error signal. In one implementation, the switching waveform can be a rectangular waveform that is applied to the switching device 304 to control the frequency with which the switching device 304 is switched on/off. The DC power signal level can be maintained at approximately the voltage threshold 432 by controlling when and for how long the switching device 304 switches on or switches off. In one example, as depicted with reference to FIG. 4, the switching device 304 can comprise a power field effect transistor (FET). In the example shown in FIG. 4, the output of the PWM 436 is connected to the gate terminal of the FET, the drain terminal of the FET can be connected to the Earth ground 406, and the source terminal of the FET can be connected to a second terminal of the primary winding 314A of the transformer. In one implementation, the PWM 436 can control (using the switching waveform) the gate voltage applied to (and/or the duration for which the gate voltage is applied to) the power FET to control the impedance of the power FET. This, in turn, can cause the power FET to vary the amount of the rectified signal coupled to the primary winding 314A of the transformer. For example, in response to determining that the DC power signal level is greater than the threshold voltage 432, the PWM 436 can cause the switching device 304 to switch off. Accordingly, a smaller percentage of the rectified signal can be coupled to the primary winding 314A of the transformer, thus decreasing the DC power signal level. In response to determining that the DC power signal level is less than the threshold voltage 432, the PWM 436 can cause the switching device 304 to switch on. Accordingly, a larger percentage of the rectified signal can be coupled to the primary winding 314A of the transformer, thus increasing the DC power signal level. In some implementations, the switch mode controller 312 and/or the switching device 304 can also comprise a filter stage for filtering the switching noise and other transient noise effects. Furthermore, as described above, the feedback signal provided to the switch mode controller 312 also comprises the zero cross signal 322. The net effect of injecting the zero cross signal 322 into the feedback path (via the summing unit 310) is a modulation of the zero cross signal 322 on the primary winding 314A of the transformer. This modulation is coupled to the secondary winding 314B of the transformer so the DC power signal at the output of the DC output generation unit 308 is modulated with the zero cross signal 322 (e.g., as depicted by the waveform 428 in FIG. 4).

Figure 5:
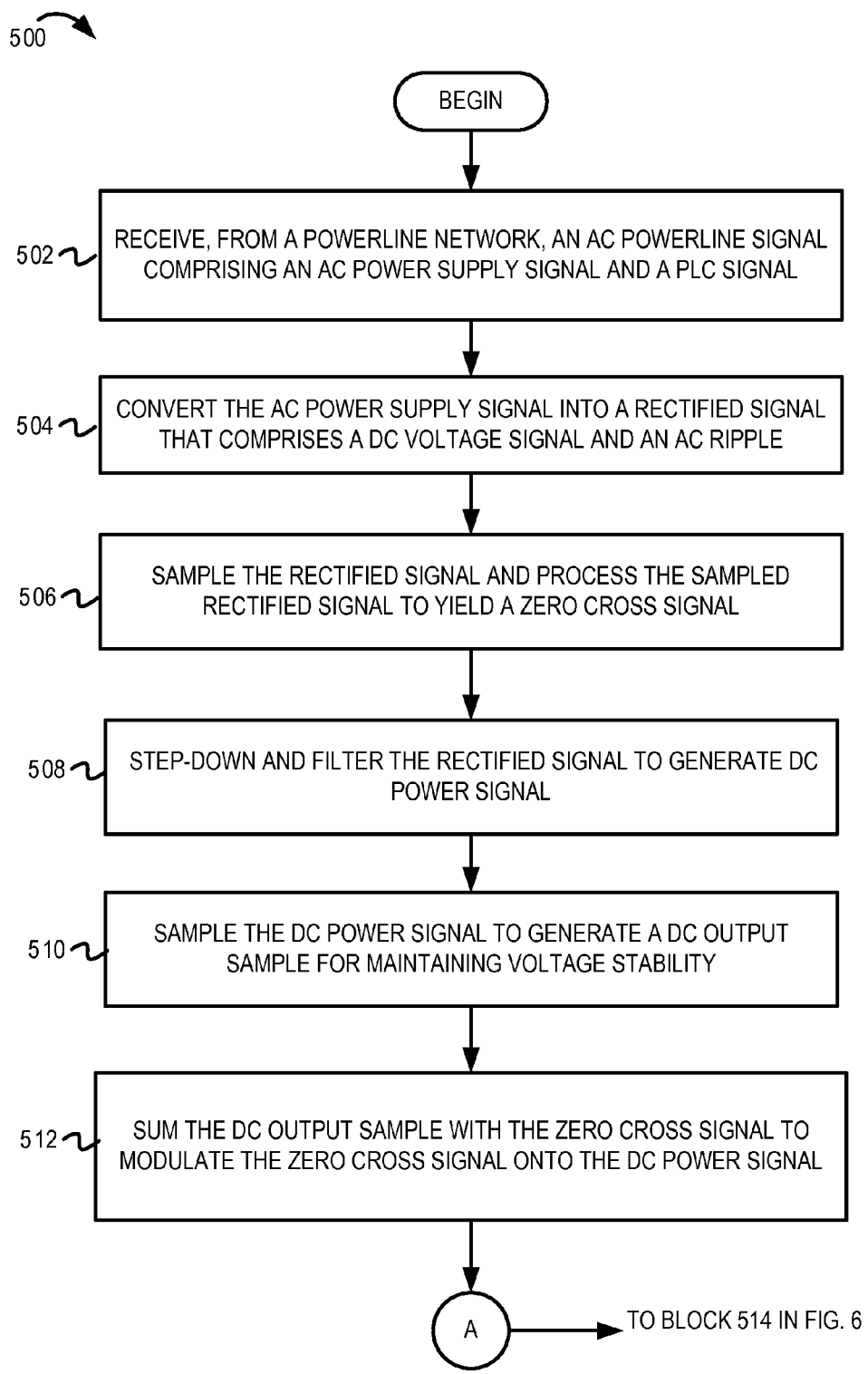
FIG. 5 is a flow diagram illustrating example operations for modulating a zero cross signal onto a DC power signal and generating a composite PLC signal.
Figure 6:
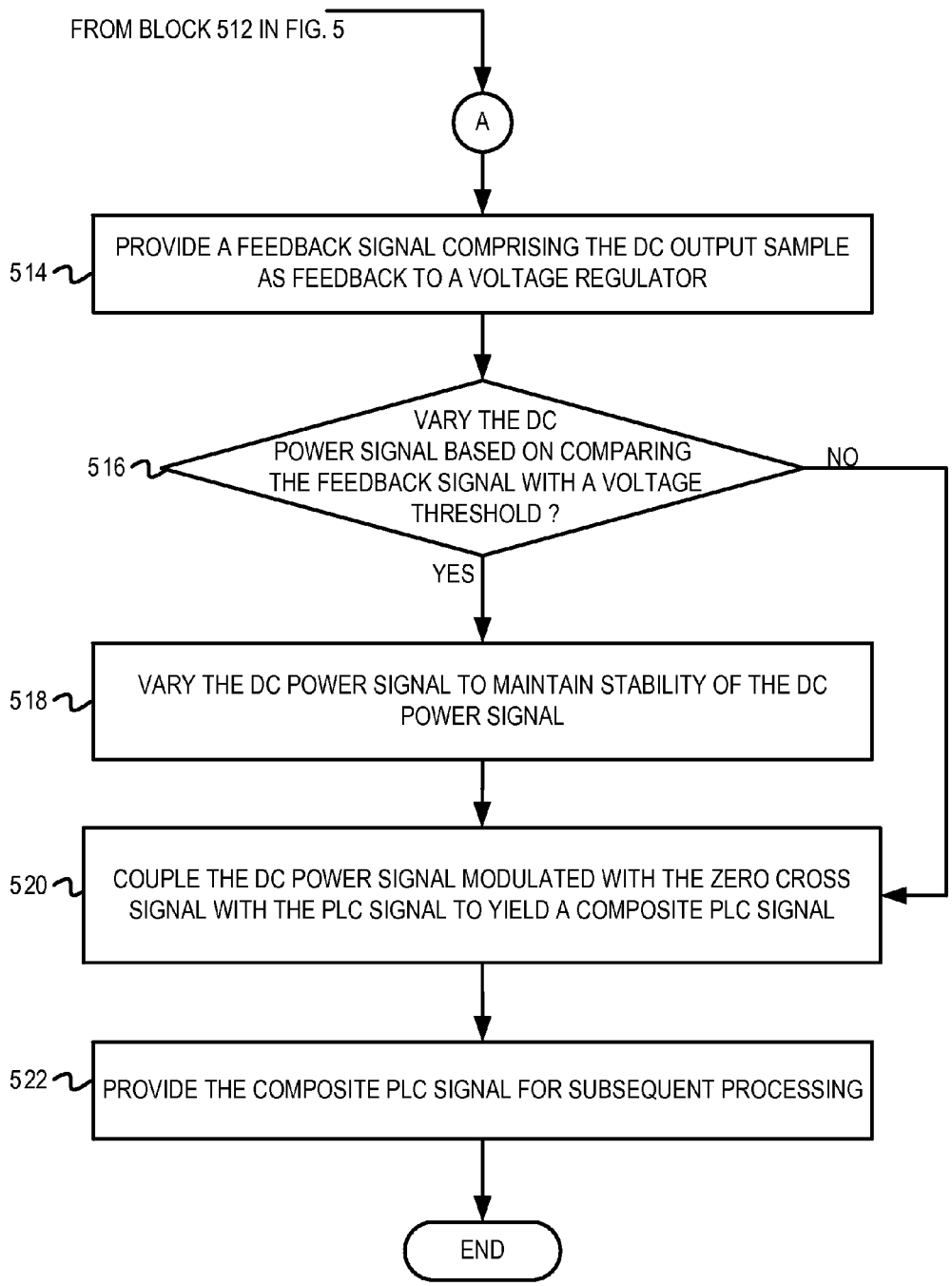
FIG. 6 is a continuation of FIG. 5 and also illustrates example operations for modulating a zero cross signal onto a DC power signal and generating a composite PLC signal.

FIG. 5 and FIG. 6 depict a flow diagram ("flow") 500 illustrating example operations for modulating a zero cross signal onto a DC power signal and generating a composite PLC signal. The flow 500 begins at block 502 in FIG. 5.

At block 502, an AC powerline signal is received from a powerline network. For example, with reference to FIG. 1, the power supply processing unit 102 can receive the AC powerline signal via the line terminal connecting wire 120 and the neutral terminal connecting wire 122 from the powerline network. The AC powerline signal may be received from a source PLC device and the power supply processing unit 122 may be implemented as part of a destination PLC device. The AC powerline signal can comprise a PLC signal (e.g., including data/control/management bits) superposed on an AC power supply signal (e.g., a 120V/60 Hz AC power supply signal). The flow continues at block 504.

At block 504, the AC power supply signal is converted into a DC voltage signal comprising an AC ripple (i.e., the rectified signal). For example, as described above with reference to FIGS. 3-4, the rectification unit 302 of the power supply and zero cross generation unit 104 can receive the AC power supply signal and generate the rectified signal. As one example, the rectification unit 302 may receive a 120V AC powerline waveform 401 and generate a rectified waveform 410 that comprises a 30V AC ripple superimposed on a 170V DC signal. As another example, the rectification unit 302 may receive a 240V AC powerline waveform 401 and generate a rectified waveform 410 that comprises a 30V AC ripple superimposed on a 340V DC signal. Additionally, as depicted by the waveforms 401 and 410 of FIG. 4, the frequency of the AC ripple is twice the frequency of the line frequency of the AC powerline waveform 401. For example, if the line frequency is 60 Hz, the AC ripple frequency will be 120 Hz. The flow continues at block 506.

At block 506, the rectified signal is sampled and processed to yield a zero cross signal. For example, as described above with reference to FIGS. 3-4, the powerline sampling unit 306 can sample the rectified signal 410, filter the rectified signal 410 to remove the DC component of the rectified signal 410, and scale the resultant AC ripple component by a predetermined scale factor to yield the zero cross signal. As will be described below, the zero cross signal can be modulated onto the output DC voltage to enable proper processing of the PLC signal at the PLC modem unit 110. The flow continues at block 508.

At block 508, the rectified signal is stepped-down and filtered to generate a DC power signal. For example, as described above with reference to FIGS. 3-4, the rectification unit 302 can provide the rectified signal (generated at block 304) to the primary winding 314A of a transformer. The transformer can step down the high voltage rectified signal (e.g., a 170V DC signal component) to yield a low voltage rectified signal (e.g., a 3.3V DC signal component). The DC output generation unit 308 can then filter the low voltage rectified signal and minimize the AC component from the low voltage rectified signal to generate the DC power signal. As described above, the DC power signal can be provided to subsequent processing units that utilize a stable low DC voltage for proper operation. The flow continues at block 510.

At block 510, the DC power signal is sampled to generate a DC output sample for maintaining voltage stability. For example, as described above with reference to FIGS. 3-4, the DC power signal at the output of the DC output generation unit 308 can be sampled to generate the DC output sample 320. The DC output sample 320 can be provided (via the summing unit 310) as feedback to maintain a relatively stable DC power signal level regardless of line and load variations. The flow continues at block 512.

At block 512, the DC output sample is summed with the zero cross signal to modulate the zero cross signal onto the DC power signal. For example, as described above with reference to FIGS. 3-4, the summing unit 310 can combine (or sum) the DC output sample 320 (determined at block 510) with the zero cross signal 322 (determined at block 506). The net effect of coupling the zero cross signal into the feedback path is a modulation of the zero cross signal on the DC power signal. The DC output sample with the modulated zero cross signal (i.e., the feedback signal) can then be provided to the voltage regulator 316 for maintaining a stable DC power signal level and for ensuring that the zero cross signal is coupled with the DC power signal at the output of the power supply and zero cross generation unit 104. As will be described below, the modulation of the zero cross signal on the DC power signal at the output of the power supply and zero cross generation unit 104 can also be provided (in conjunction with the PLC signal) for subsequent processing of the PLC signal by the PLC modem unit 110. The flow continues at block 514 in FIG. 6.

At block 514, a feedback signal comprising the DC output sample is provided to the voltage regulator. As described above with reference to FIGS. 3-4, the DC output sample 322 is fed back into the closed loop system of the power supply and zero cross generation unit 104 to maintain stability of the DC power signal. The summing unit 310 combines the DC output sample 320 and the zero cross signal 322 to generate the feedback signal. The summing unit 310 provides the feedback signal to the switch mode controller 312 of the voltage regulator 316. The flow continues at block 516.

At block 516, it is determined whether to vary the DC power signal level based on comparing the feedback signal with a voltage threshold. For example, as described above with reference to FIGS. 3-4, the switch mode controller 312 can compare the DC output sample 320 (e.g., the DC level of the feedback signal received at block 512) with the voltage threshold 432. The switch mode controller 312 can generate an error signal that is proportional to the difference between the DC output sample 320 and the voltage threshold 432. As will be described below, based on the error signal, the switch mode controller 312 and the switching device 304 can maintain a relatively constant DC power signal level. If it is determined to vary the DC power signal level, the flow continues at block 518. Otherwise, the flow continues at block 520.

At block 518, the DC power signal level is varied to maintain stability of the DC power signal. For example, as described above with reference to FIGS. 3-4, the switch mode controller 312 (e.g., the PWM 436 of the switch mode controller 312) can generate a switching waveform (based on the error signal) to control the operating mode of the switching device 304. The switch mode controller 312 can apply the switching waveform to the switching device 304 to cause the switching device to switch on or switch off for a predetermined time interval that is dependent on the duty cycle of the switching waveform (and consequently on the error signal). Accordingly, the voltage input at the primary winding 314A of the transformer can be varied to maintain a relatively constant DC power signal level (at the output of the secondary winding 314B of the transformer) regardless of line and load variations. The flow continues at block 520.

At block 520, the DC power signal modulated with the zero cross signal and the PLC signal are coupled to yield a composite PLC signal. For example, as described with reference to FIGS. 1-2, the biasing circuit 108 of the power supply processing unit 102 can couple the PLC signal with the modulated DC power signal (comprising the zero cross signal) to yield the composite PLC signal. In some implementations, the power supply and zero cross generation unit 104 can also generate a ground signal. In this implementation, the biasing circuit 108 can couple the PLC signal, the modulated DC power signal (comprising the zero cross signal), and the ground signal to yield the composite PLC signal. As described above with reference to FIG. 2, the biasing circuit 108 can filter the AC powerline signal to remove low frequency signal components and to extract the PLC signal. The biasing circuit 108 can also filter the modulated DC power signal and the ground signal received from the power supply and zero cross generation unit 104 to remove unwanted higher frequency components. The biasing circuit 108 can then combine the PLC signal with the modulated DC power signal and the ground signal to generate the composite PLC signal. The flow continues at block 522.

At block 522, the composite PLC signal is provided for subsequent processing. For example, as described above with reference to FIGS. 1-2, the biasing circuit 108 of the power supply processing unit 102 can provide the composite PLC signal to the biasing circuit 114 of the PLC modem unit 110. In some implementations, the biasing circuit 108 and the biasing circuit 114 may be coupled via a connection interface 202. In another implementation, the biasing circuits 108 and 114 may be directly coupled via a two-wire (or a multi-wire) plug and socket connection. The operations of the PLC modem unit 110 are further described with reference to FIGS. 7-8. From block 522, the flow ends.

It is noted that although FIG. 6 depicts the flow 500 moving from block 518 to block 520, the operations of blocks 514-518 and the operations of blocks 520-522 are typically performed in parallel. In other words, the DC power signal is continuously sampled and monitored to maintain a constant DC power signal level. The zero cross signal (i.e., the AC ripple sample) is also continuously coupled with the DC power signal so that the output of the DC output generation unit 308 is a modulation of the zero cross signal on the DC power signal. Additionally, it is also noted that although FIGS. 4-6 describe the summing unit 310 connecting the feedback signal (comprising the DC output sample 320) to the signal input of the comparator 434, embodiments are not so limited. In other embodiments, the feedback signal may be connected to (or summed with) the voltage threshold input 432 of the comparator 434.

Figure 7:
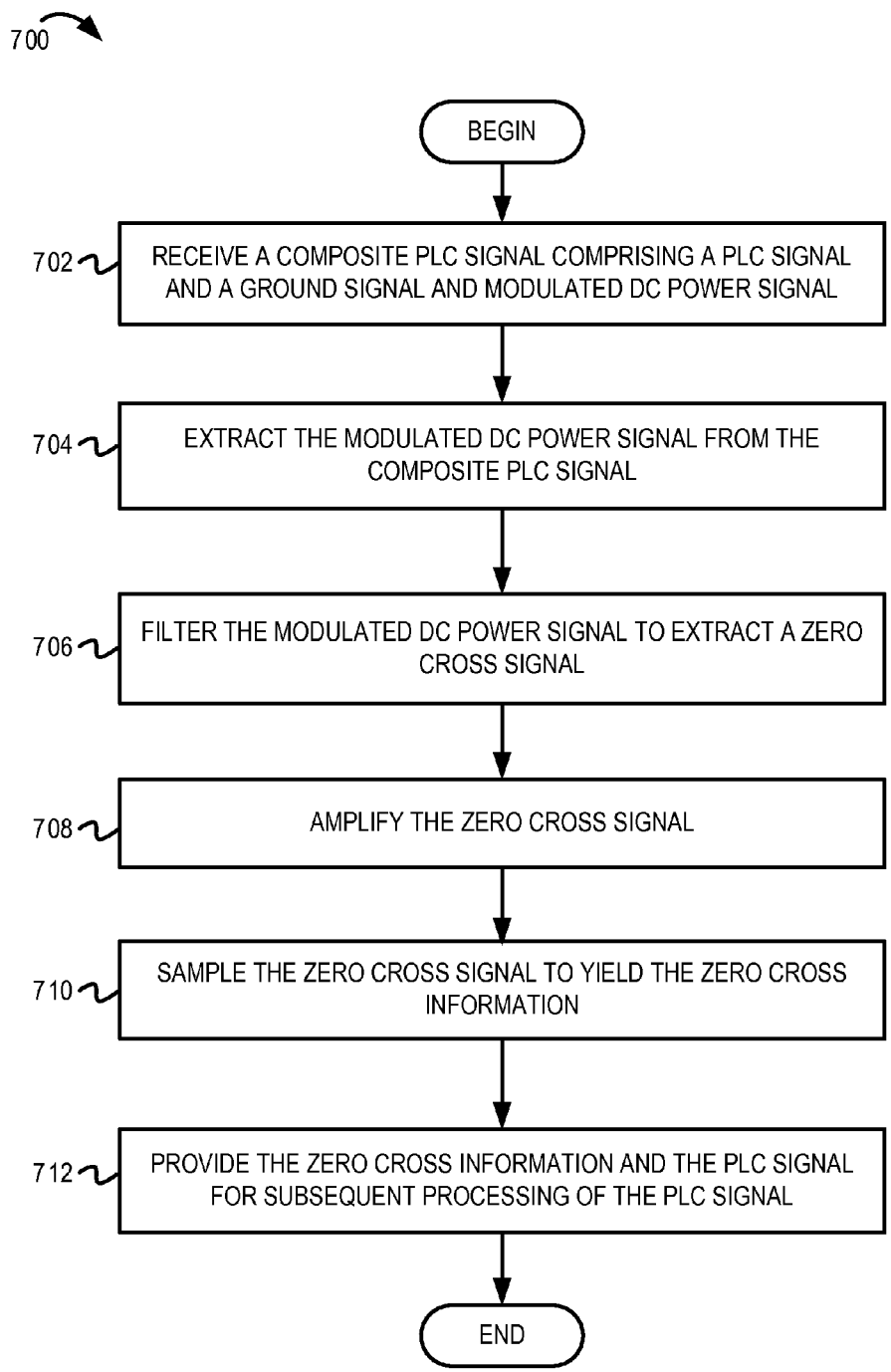
FIG. 7 is a flow diagram illustrating example operations for extracting zero cross information from a composite PLC signal.

FIG. 7 is a flow diagram 700 illustrating example operations for extracting zero cross information from a composite PLC signal. The flow begins at block 702.

At block 702, a composite PLC signal comprising a PLC signal and a modulated DC power signal is received. As described above with reference to FIG. 1, the PLC modem unit 110 can receive the modulated DC power signal comprising a zero cross signal (e.g., the zero cross signal modulated on the DC power signal), and a ground signal. The PLC signal can comprise data/control/management bits received via the powerline network at the power supply processing unit 102 (described above with reference to FIGS. 5-6). In one implementation, the biasing circuit 114 of the PLC modem unit 110 can receive the composite PLC signal from the biasing circuit 108 of the power supply processing unit 102. The flow continues at block 704.

At block 704, the modulated DC power signal is extracted from the composite PLC signal. For example, with reference to FIGS. 1-2, the biasing circuit 114 can split the composite PLC signal to separate the modulated DC power signal and the ground signal from the PLC signal by passing the composite PLC signal through low pass filters and high pass filters, respectively. The biasing circuit 114 can provide the PLC signal to the PLC transceiver unit 116 for subsequent processing of the PLC signal. The biasing circuit 114 can provide the modulated DC power signal to the zero cross detector 112. The operations of the zero cross detector 114 are described below in blocks 706-710 and FIG. 8. Furthermore, in some implementations, the biasing circuit 114 can also provide the DC power signal and the ground signal to the PLC transceiver unit 116, as depicted in FIG. 1. In other implementations, the biasing circuit 114 can provide the extracted modulated DC power signal and the ground signal to the PLC transceiver unit 116 (or another intermediate processing unit), and the PLC transceiver unit 116 (or the intermediate processing unit) can extract the DC power signal and the ground signal. The flow continues at block 706.

Figure 8:
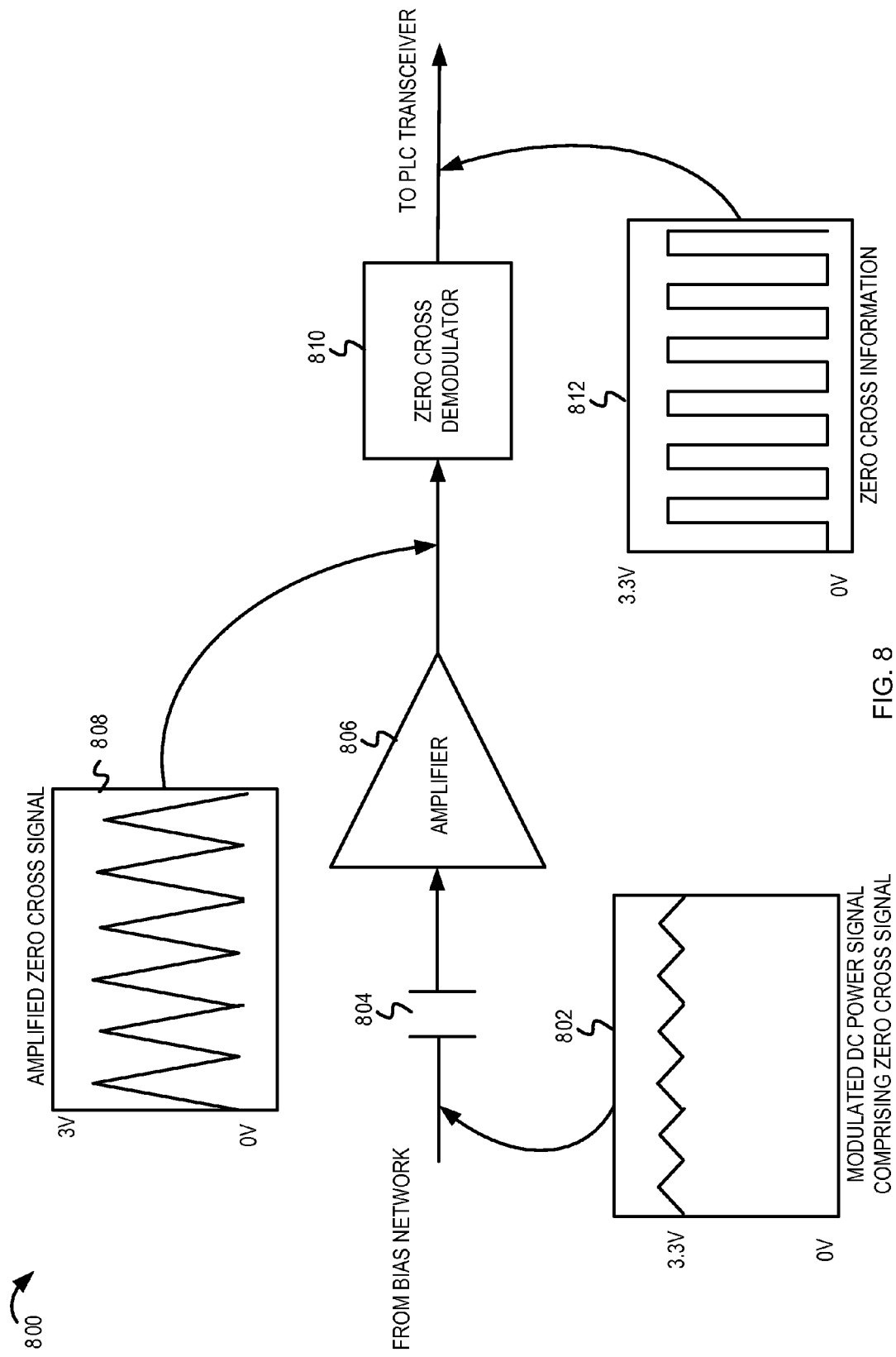
FIG. 8 is an example block diagram illustrating operations for extracting zero cross information from a composite PLC signal.

At block 706, the modulated DC power signal is filtered to extract the zero cross signal. For example, the zero cross detector 112 can filter the modulated DC power signal and the ground signal to extract the zero cross signal. FIG. 8 illustrates an example embodiment of the zero cross detector 112. In one example as depicted in FIG. 8, the zero cross detector 112 comprises a capacitor 804, an amplifier 806, and a zero cross demodulator 810. The modulated DC power signal (depicted by the waveform 802) is coupled to the capacitor 804. The capacitor 804 provides low impedance path to the zero cross signal. It is noted, however, that in other implementations the modulated DC power signal (comprising the zero cross signal) can be passed through other suitable filter stages to extract the zero cross signal. The flow continues at block 708.

At block 708, the zero cross signal is amplified. For example, the amplifier 806 can amplify the zero cross signal (e.g., by a predefined amount). The amplified zero cross signal is depicted by waveform 808. The amplified zero cross signal depicted by waveform 808 may not comprise any DC component. The flow continues at block 710. It is noted, however, that in other implementations, the zero cross signal may not be amplified. Instead, the zero cross signal may be directly processed to extract the zero cross information, as will be described in block 710.

At block 710, the zero cross signal is sampled to yield the zero cross information. For example, the zero cross demodulator 810 can sample the amplified zero cross signal 808 to yield the zero cross information 812. In one example, the zero cross demodulator 810 can comprise a comparator and a sampling unit. The zero cross demodulator 810 can slice the amplified zero cross signal 808, and can generate a logic level zero cross sample or a sampled representation of the zero cross signal referred to herein as the zero cross information. The zero cross demodulator 810 generates the zero cross information (e.g., shown in waveform 812) that comprises a narrow pulse that coincides exactly with the zero voltage condition (e.g., that indicates when the AC powerline signal switched between a positive voltage level and a negative voltage level). Thus, the frequency of the zero cross information waveform 812 is equal to the AC line frequency (e.g., 50 Hz or 60 Hz). The flow continues at block 712.

At block 712, the zero cross information and the PLC signal are provided for subsequent processing of the PLC signal. For example, the zero cross demodulator 810 can provide the zero cross information 812 to the PLC transceiver unit 116. In addition, the PLC transceiver unit 116 can also receive the PLC signal (e.g., from the biasing circuit 114), the DC power signal, and the ground signal. The PLC transceiver unit 116 can then process the PLC signal and can extract the information bits from the PLC signal based on the zero cross information. The PLC transceiver unit 116 can use the zero cross information to determine the timing and synchronization information, to determine appropriate time instants for sampling the PLC signal to enable proper demodulation, decoding, and detection of the PLC signal. From block 712, the flow ends.

It should be understood that FIGS. 1-8 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. For example, although the examples described herein describe a two-wire powerline communication power supply and modem interface mechanism coupling to an outlet, in other examples the powerline communication power supply and modem interface mechanism may include a three-wire power supply coupling to an outlet. The three-wire coupling may provide support for an additional channel provided by the ground connector, which may be used for providing control signaling, exploiting switch diversity or multiple-input multiple-output (MIMO) configurations. In this embodiment, the biasing circuit 108 of the power supply processing unit 102 can provide the composite PLC signal to the biasing circuit 114 of the PLC modem unit 110 via a three-wire cable. The connection interface 202 may be a three-pin plug and socket connection device that couples the power supply processing unit 102 to the PLC modem unit 110. In other embodiments, the powerline communication power supply and modem interface mechanism may include a multi-wire power supply coupling to an outlet and the connection interface 202 may be a multi-pin plug and socket connection device that couples the power supply processing unit 102 to the PLC modem unit 110.

It is noted that although the Figures describe the zero cross signal being coupled to the DC power signal by summing the zero cross signal with the DC output sample 320, embodiments are not so limited. In other embodiments, the zero cross signal can be coupled to the DC power signal by summing the zero cross signal with the voltage reference 432. Furthermore, the modulation level or the percentage of the zero cross signal that is coupled with the DC power signal can also be varied (e.g., by increasing or decreasing the amplitude of the AC ripple sample). Lastly, although FIGS. 1-6 describe the power supply and zero cross generation unit and 104 generating the modulated DC power signal that is provided to the PLC modem unit 110, embodiments are not so limited. In other embodiments, the power supply and zero cross generation unit 104 can provide three distinct signals—the DC power signal, the zero cross signal, and the ground signal to the biasing circuit 108. The biasing circuit 108 can then provide the composite signal comprising the PLC signal, the DC power signal, the zero cross signal, and the ground signal to the PLC modem unit 110.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
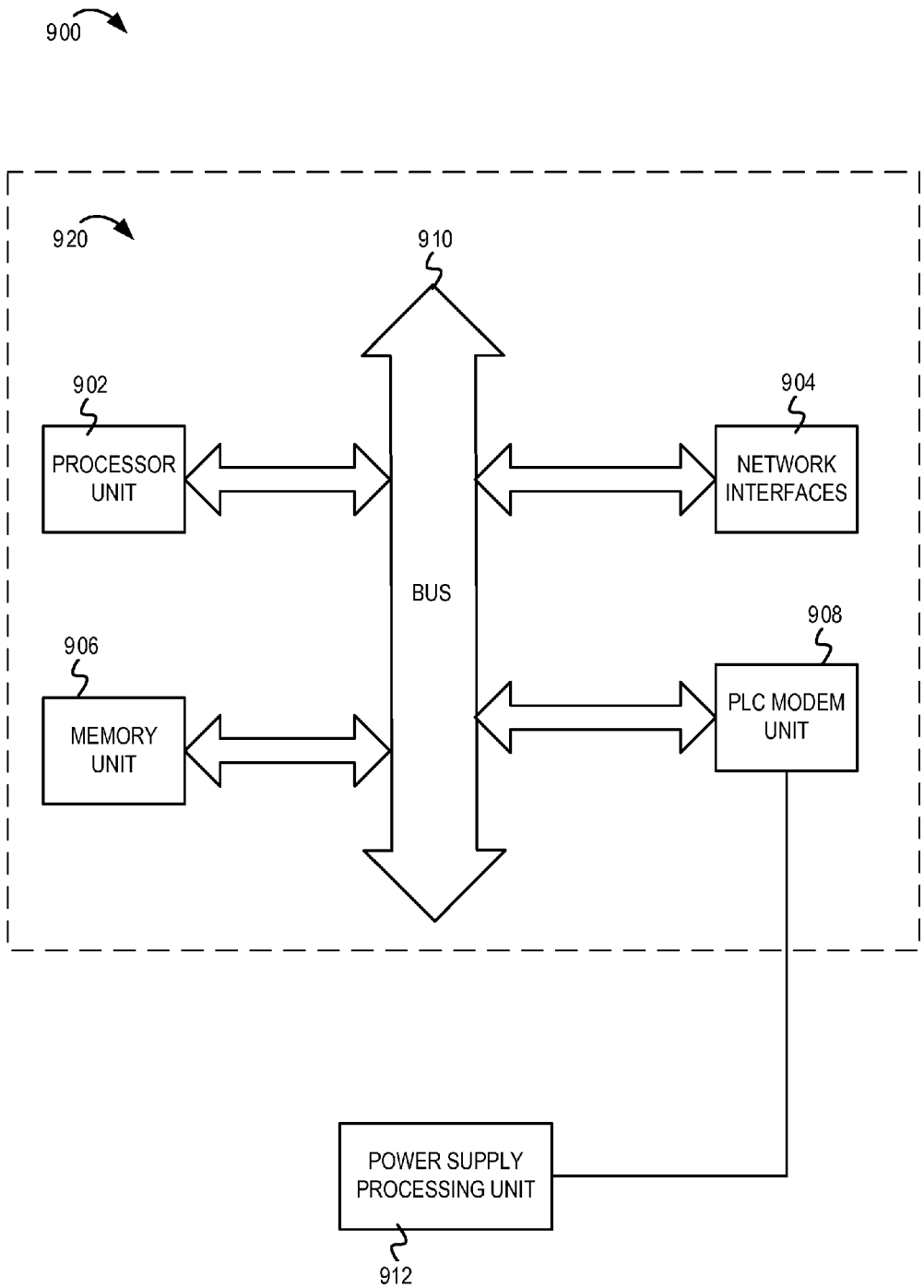
FIG. 9 is a block diagram of one embodiment of a system including a powerline communication power supply and modem interface that utilizes a two-wire connection for power, PLC signal and zero cross information, according to some embodiments.

FIG. 9 is a block diagram of one embodiment of a system 900 including a powerline communication power supply and modem interface mechanism that utilizes a two-wire connection for power, PLC signal and zero cross information, according to some embodiments. The system 900 comprises an electronic device 920 that includes a PLC modem unit 908, which is coupled to a power supply processing unit 912. In some implementations, as depicted in FIG. 9, the PLC modem unit 908 can be included within one of a personal computer (PC), a netbook, a notebook computer, a tablet computer, a gaming console, a mobile phone, a personal digital assistant (PDA), a smart appliance, or other electronic devices 920 configured for powerline communication. The power supply processing unit 912 can be included in a power supply adapter (e.g., a laptop power block/adapter) or a wall module that is externally coupled with the electronic device 920. In some implementations, the PLC modem unit 908 and the power supply processing unit 912 can both be included within the electronic device configured for powerline communication. In other implementations, the PLC modem unit 908 and the power supply processing unit 912 can be embodied on distinct integrated circuits on a common circuit board (or on separate circuit boards that are externally coupled together). The power supply processing unit 912 implements functionality to generate a zero cross signal, a DC power signal, and a ground signal from an input AC powerline signal (comprising a PLC signal and an AC power supply signal). The power supply processing unit 912 can also combine the generated zero cross signal, the DC power signal, and the ground signal with the PLC signal to generate a composite PLC signal, as described above with reference to FIGS. 1-6. The power supply processing unit 912 can provide the composite PLC signal to the PLC modem unit 908. The PLC modem unit 908 implements functionality to extract the zero cross information from the composite PLC signal and to use the zero cross information for subsequent processing of the PLC signal, as described above with reference to FIGS. 1-2, and 7-8.

The electronic device 900 also includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, Infini-Band®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.). Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the memory unit 906, and the network interfaces 906 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, a powerline communication power supply and modem interface mechanism as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising:
   a power supply processing circuit operable to:
   generate a DC power signal based on an AC powerline signal received via a powerline communication (PLC) network;
   determine an AC zero cross signal associated with the received AC powerline signal;
   modulate the AC zero cross signal onto the DC power signal;
   extract a PLC signal from the AC powerline signal;
   generate a composite PLC signal comprising the PLC signal and the DC power signal modulated with the AC zero cross signal; and
   a PLC modem circuit operable to:
   extract the PLC signal from the composite PLC signal received from the power supply processing circuit;
   extract the DC power signal modulated with the AC zero cross signal from the composite PLC signal;
   extract the AC zero cross signal from the DC power signal modulated with the AC zero cross signal; and
   process the PLC signal based, at least in part, on zero cross information associated with the AC zero cross signal.

2. The apparatus of claim 1, wherein the power supply processing circuit is coupled to the PLC modem circuit via a two-wire connector.

3. The apparatus of claim 1, wherein the power supply processing circuit comprises:

a rectifier circuit operable to generate a rectified signal comprising a DC power component and a superimposed AC ripple component;

a transformer circuit operable to step-down the rectified signal to yield a low voltage rectified signal; and a filter circuit operable to filter the low voltage rectified signal to minimize the AC ripple component and to yield the DC power signal.

4. The apparatus of claim 3, wherein the power supply processing circuit operable to determine the AC zero cross signal associated with the received AC powerline signal further comprises:

a powerline sampling circuit operable to filter a sample of the rectified signal to remove the DC component and to yield the AC zero cross signal.

5. The apparatus of claim 4, wherein the power supply processing circuit comprises:

an output sampling circuit operable to provide a sample of the DC power signal modulated with the AC zero cross signal as feedback to a summing circuit associated with the power supply processing circuit;

the summing circuit operable to:
combine the AC zero cross signal received from the powerline sampling circuit with the sample of the DC power signal modulated with the AC zero cross signal received from the output sampling circuit to yield a feedback signal; and
provide the feedback signal to a voltage regulator circuit associated with the power supply processing circuit; and the voltage regulator circuit operable to:
maintain stability of the DC power signal based, at least in part, on the sample of the DC power signal that constitutes the feedback signal; and
couple the feedback signal with the rectified signal generated by the rectifier circuit to modulate the AC zero cross signal on the DC power signal.

6. The apparatus of claim 5, wherein the voltage regulator circuit operable to maintain the stability of the DC power signal based, at least in part, on the sample of the DC power signal that constitutes the feedback signal further comprises:

a switch mode controller circuit operable to:
generate an error signal based, at least in part, on a difference between the sample of the DC power signal and a threshold DC signal;
generate a switching waveform based, at least in part, on the error signal; and
apply the switching waveform to a switching device associated with the power supply processing circuit to control an amplitude of the DC power signal.

7. The apparatus of claim 1, wherein the power supply processing circuit comprises a biasing circuit, and wherein the power supply processing circuit operable to generate the composite PLC signal comprising the PLC signal and the DC power signal modulated with the AC zero cross signal comprises the biasing circuit operable to:

couple the PLC signal with the DC power signal modulated with the AC zero cross signal to generate the composite PLC signal; and provide the composite PLC signal comprising the PLC signal and the DC power signal modulated with the AC zero cross signal to a corresponding biasing circuit associated with the PLC modem circuit.

8. The apparatus of claim 1, wherein the PLC modem circuit comprises a biasing circuit, and wherein the PLC modem circuit operable to extract the PLC signal from the composite PLC signal received from the power supply processing circuit comprises the biasing circuit operable to:

high pass filter the composite PLC signal to remove the DC power signal modulated with the AC zero cross signal and to yield the PLC signal.

9. The apparatus of claim 1, wherein the PLC modem circuit comprises a biasing circuit, and wherein the PLC modem circuit operable to extract the DC power signal modulated with the AC zero cross signal from the composite PLC signal comprises the biasing circuit operable to:

filter the composite PLC signal using a first filter stage to extract the DC power signal modulated with the AC zero cross signal.

10. The apparatus of claim 9, wherein the PLC modem circuit operable to extract the AC zero cross signal from the DC power signal modulated with the AC zero cross signal further comprises:

a zero cross detector circuit associated with the PLC modem circuit operable to:
filter the DC power signal modulated with the AC zero cross signal using a second filter stage to extract the AC zero cross signal; and
sample the AC zero cross signal to generate the information associated with the AC zero cross signal that is representative of timing of zero crossings of the AC powerline signal.

11. A powerline processing circuit comprising:

a power supply and zero cross generator circuit operable to:
generate a DC power signal based on an AC powerline signal received via a powerline communication (PLC) network;
determine an AC zero cross signal associated with the received AC powerline signal; and
modulate the AC zero cross signal onto the DC power signal; and a biasing circuit operable to:
extract a PLC signal from the AC powerline signal; and
generate a composite PLC signal comprising the PLC signal and the DC power signal modulated with the AC zero cross signal.

12. The powerline processing circuit of claim 11, wherein the power supply and zero cross generator circuit operable to generate the DC power signal based on the AC powerline signal received via the PLC network comprises:

a rectifier circuit operable to generate a rectified signal comprising a DC power component and a superimposed AC ripple component;

a transformer circuit operable to step-down the rectified signal to yield a low voltage rectified signal; and a filter circuit operable to filter the low voltage rectified signal to minimize the AC ripple component and to yield the DC power signal.

13. The powerline processing circuit of claim 12, wherein the power supply and zero cross generator circuit operable to determine the AC zero cross signal associated with the received AC powerline signal further comprises:

a powerline sampling circuit operable to filter a sample of the rectified signal to remove the DC component and to yield the AC zero cross signal.

14. The powerline processing circuit of claim 13, wherein the powerline sampling circuit comprises a resistor coupled in series with a capacitor, wherein a first terminal of the resistor is coupled with an output terminal of the rectifier circuit and a primary winding of the transformer circuit, a second terminal of the resistor is coupled with a first terminal of the capacitor, and a second terminal of the capacitor is coupled with a summing circuit associated with the power supply and zero cross generator.

15. The powerline processing circuit of claim 13, wherein the power supply and zero cross generator circuit comprises:
an output sampling circuit operable to provide a sample of the DC power signal modulated with the AC zero cross signal as feedback to a summing circuit associated with the power supply and zero cross generator circuit;
the summing circuit operable to:
combine the AC zero cross signal received from the powerline sampling circuit with the sample of the DC power signal modulated with the AC zero cross signal received from the output sampling circuit to yield a feedback signal;
provide the feedback signal to a voltage regulator circuit associated with the power supply and zero cross generator circuit; and
the voltage regulator circuit operable to:
maintain stability of the DC power signal based, at least in part, on the sample of the DC power signal that constitutes the feedback signal; and
couple the feedback signal with the rectified signal generated by the rectifier circuit to modulate the AC zero cross signal on the DC power signal.

16. The powerline processing circuit of claim 15, wherein the voltage regulator circuit operable to maintain the stability of the DC power signal based, at least in part, on the sample of the DC power signal that constitutes the feedback signal further comprises:
a switch mode controller circuit operable to:
generate an error signal based, at least in part, on a difference between the sample of the DC power signal and a threshold DC signal;
generate a switching waveform based, at least in part, on the error signal; and
apply the switching waveform to a switching device associated with the power supply and zero cross generator circuit to control an amplitude of the DC power signal.

17. The powerline processing circuit of claim 16, wherein the switch mode controller circuit comprises a comparator circuit coupled with a pulse width modulator circuit, and
wherein the switch mode controller circuit operable to generate the error signal based, at least in part, on the difference between the sample of the DC power signal and the threshold DC signal comprises the comparator circuit operable to:
receive the sample of the DC power signal and the AC zero cross signal from the output sampling circuit;
compare the sample of the DC power signal against the threshold DC signal;
generate the error signal at a first voltage level in response to determining that the DC power signal is exceeds the threshold DC signal;
generate the error signal at a second voltage level in response to determining that the DC power signal is below the threshold DC signal; and
provide the error signal to the pulse width modulator circuit; and
wherein the pulse width modulator circuit is operable to:
generate the switching waveform based, at least in part, on the error signal; and
apply the switching waveform to the switching device to control the amplitude of the DC power signal.

18. The powerline processing circuit of claim 17, wherein the switching device comprises a power field effect transistor (FET), wherein a gate terminal of the power FET is coupled to an output terminal of the pulse width modulator circuit, a drain terminal of the power FET is coupled to a ground terminal, and a source terminal is coupled to a primary winding of a transformer circuit associated with the power supply and zero cross generator circuit.

19. The powerline processing circuit of claim 11, wherein the biasing circuit comprises:
a first filter stage operable to extract the PLC signal from the AC powerline signal;
a second filter stage coupled in series with the power supply and zero cross generator circuit operable to filter the DC power signal modulated with the AC zero cross signal; and
a coupling circuit operable to couple the PLC signal with the DC power signal modulated with the AC zero cross signal to generate the composite PLC signal.

20. A method comprising:
generating a DC power signal based on an AC powerline signal received via a powerline communication (PLC) network;
determining an AC zero cross signal associated with the received AC powerline signal;
modulating the AC zero cross signal onto the DC power signal;
extracting a PLC signal from the AC powerline signal; and
generating a composite PLC signal comprising the PLC signal and the DC power signal modulated with the AC zero cross signal.

21. The method of claim 20, wherein said generating the DC power signal based on the AC powerline signal received via the PLC network further comprises:
generating a rectified signal comprising a DC power component and a superimposed AC ripple component;
stepping-down the rectified signal to yield a low voltage rectified signal; and
filtering the low voltage rectified signal to minimize the AC ripple component and to yield the DC power signal.

22. The method of claim 21, wherein said determining the AC zero cross signal associated with the received AC powerline signal further comprises:
filtering a sample of the rectified signal to remove the DC component and to yield the AC zero cross signal.

23. The method of claim 20, further comprising:
receiving a sample of the DC power signal and the AC zero cross signal as feedback;
maintaining voltage stability of the DC power signal based, at least in part, on the sample of the DC power signal; and
superimposing the AC zero cross signal on the DC power signal to modulate the AC zero cross signal on the DC power signal.

24. The method of claim 23, wherein said maintaining voltage stability of the DC power signal further comprises:
comparing a voltage level associated with the DC power signal against a predetermined voltage threshold;
generating an error signal based, at least in part, on a difference between the voltage level associated with the DC power signal and the predetermined voltage threshold in response to said comparing the voltage level associated with the DC power signal against the predetermined voltage threshold;
generating a switching waveform based, at least in part, on the error signal; and
applying the switching waveform to a switching device to control an amplitude of the DC power signal.

25. The method of claim 20, wherein said generating the composite PLC signal comprising the PLC signal and the DC power signal modulated with the AC zero cross signal comprises:
   coupling the PLC signal with the DC power signal modulated with the AC zero cross signal to generate the composite PLC signal.

\* \* \* \* \*